United States Patent
Klingström (10) Patent No.: US 11,209,901 B2
(45) Date of Patent: Dec. 28, 2021

(54) ESTIMATING CORNEA RADIUS FOR USE IN EYE TRACKING

(71) Applicant: Tobii AB, Danderyd (SE)

(72) Inventor: Andreas Klingström, Danderyd (SE)

(73) Assignee: Tobii AB, Danderyd (SE)

( * ) Notice: Subject to any disclaimer, the term of this patent is extended or adjusted under 35 U.S.C. 154(b) by 70 days.

(21) Appl. No.: 16/726,105

(22) Filed: Dec. 23, 2019

(65) Prior Publication Data

US 2020/0257359 A1 Aug. 13, 2020

(51) Int. Cl.
| | |
|---|---|
| G06F 3/01 | (2006.01) |
| G06T 7/73 | (2017.01) |
| G06T 7/62 | (2017.01) |
| H04N 5/225 | (2006.01) |
| H04N 5/247 | (2006.01) |
| G06T 7/246 | (2017.01) |
| A01F 3/00 | (2006.01) |

(52) U.S. Cl.
CPC ............... G06F 3/013 (2013.01); A01F 3/00 (2013.01); G06T 7/251 (2017.01); G06T 7/62 (2017.01); G06T 7/73 (2017.01); H04N 5/2256 (2013.01); H04N 5/247 (2013.01); G06T 2207/30201 (2013.01)

(58) Field of Classification Search
CPC .......... G06F 3/013; G06T 2207/30201; G06T 7/251; G06T 7/62; G06T 7/73; G06T 2207/10016; H04N 5/2256; H04N 5/247; A01F 3/00
See application file for complete search history.

(56) References Cited

U.S. PATENT DOCUMENTS

| | | | | |
|---|---|---|---|---|
| 2003/0123027 | A1* | 7/2003 | Amir | G06K 9/00604 351/209 |
| 2013/0113704 | A1* | 5/2013 | Sarrafzadeh | A63F 13/212 345/158 |
| 2014/0211995 | A1* | 7/2014 | Model | G06F 3/013 382/103 |
| 2016/0011658 | A1* | 1/2016 | Lopez | G06F 1/1632 345/156 |
| 2017/0263007 | A1* | 9/2017 | Cavin | G06K 9/50 |
| 2019/0129501 | A1* | 5/2019 | Nistico | G06F 3/013 |
| 2020/0257357 | A1* | 8/2020 | Ren | G06T 7/80 |

OTHER PUBLICATIONS

M [Asejczyk-Widlicka] et al., ("Fluctuations in intraocular pressure and the potential effect on aberrations of the eye", Br J Ophthalmol 2007;91:1054-1058. doi: 10.1136/bjo.2006.109793 ).*

* cited by examiner

*Primary Examiner* — Dakshesh D Parikh
(74) *Attorney, Agent, or Firm* — Samuel I. Yamron (57) ABSTRACT

The present disclosure relates to an eye tracking method as well as a corresponding system and computer-readable storage medium. Calibration is performed. The calibration comprises estimating values for a plurality of parameters defining respective optical properties of an eye. The plurality of parameters includes a radius of a cornea of the eye. Eye tracking for the eye is performed using the values estimated at the calibration. An updated value of the cornea radius is estimated. Eye tracking for the eye is performed using the updated value of the cornea radius and a value estimated at the calibration for a parameter other than the cornea radius of the eye. The cornea radius of an eye may change over time. This may cause degradation of eye tracking performance. This problem may be reduced or prevented by estimating an updated value of the cornea radius.

18 Claims, 4 Drawing Sheets

ESTIMATING CORNEA RADIUS FOR USE IN EYE TRACKING

CROSS-REFERENCES TO RELATED APPLICATIONS

This application claims priority to Swedish Application No. 1851662-1, filed Dec. 21, 2018; the content of which are hereby incorporated by reference.

TECHNICAL FIELD

The present disclosure generally relates to eye tracking.

BACKGROUND

Different techniques have been developed for monitoring in which direction (or at which point on a display) a user is looking. This is often referred to as gaze tracking. Another term often employed in this context is eye tracking, which may also involve tracking of a gaze direction and/or a gaze point. However, eye tracking need not necessarily involve tracking of a gaze direction or a gaze point. In some cases, eye tracking involves tracking of a position of the eye, without actually tracking/estimating where the eye is looking. Calibration is typically needed for an eye tracking system to perform well for new users. The calibration involves adapting parameters employed by the eye tracking system to properties of the eyes of a specific user. During the calibration, the user is prompted to look at certain known stimulus points at the display while one or more cameras capture images of the user's eyes. Since the true gaze point is known, features of the eyes detected in these images may be employed to calibrate the eye tracking system. Some users experience that eye tracking performance decreases (or deteriorates) over time and therefore recalibrate their eye tracking system. Having to recalibrate the eye tracking system may be annoying since it may force the user to interrupt their current activity, which may cause the user to lose time and/or lose focus. Further, the user may not detect straight away that the eye tracking performance has decreased. Hence, the user may continue to perform a task for some time without realizing that the eye tracking performance has decreased. This may for example affect the user's efficiency and/or overall performance before the user even detects that something is wrong. It would be desirable to provide new ways to address one or more of the abovementioned issues.

SUMMARY

Methods, systems and computer-readable storage media having the features defined in the independent claims are provided for addressing one or more of the abovementioned issues. Preferable embodiments are defined in the dependent claims.

Hence, a first aspect provides embodiments of an eye tracking method. The eye tracking method comprises performing calibration. The calibration comprises estimating values for a plurality of parameters defining respective optical properties of an eye. The plurality of parameters includes a radius of a cornea of the eye. The eye tracking method comprises performing eye tracking for the eye using the values estimated at the calibration, estimating an updated value of the cornea radius, and performing eye tracking for the eye using the updated value of the cornea radius and a value estimated at the calibration for a parameter other than the cornea radius of the eye.

The inventor has realized that reduced eye tracking performance experienced by users may be caused by changes in the cornea radius of the eye. The cornea radius of an eye may change during the day, while other optical properties of the eye may remain relatively constant (or may have relatively smaller impact on gaze tracking performance than changes in the cornea radius). The cornea radius determined during the initial calibration may therefore need to be updated, while other parameter values determined during the initial calibration may not need to be updated. Eye tracking for the eye may therefore be performed using the updated value of the cornea radius and a value estimated at the calibration for a parameter other than the cornea radius of the eye, such as for example a fovea offset of the eye.

The inventor has also realized that while estimation of some optical properties of the eye (such as for example the fovea offset) may require the user to look at known stimulus points, estimation of the cornea radius may for example be performed without use of such known stimulus points. Hence, reduction (or deterioration) of eye tracking performance may be mitigated without having to occupy the user's time by doing a full-recalibration which often involves use of known stimulus points.

A second aspect provides embodiments of an eye tracking system comprising processing circuitry (or one or more processors) configured to perform calibration. The calibration comprises estimating values for a plurality of parameters defining respective optical properties of an eye. The plurality of parameters includes a radius of a cornea of the eye. The processing circuitry is configured to perform eye tracking for the eye using the values estimated at the calibration, estimate an updated value of the cornea radius, and perform eye tracking for the eye using the updated value of the cornea radius and a value estimated at the calibration for a parameter other than the cornea radius of the eye.

The processing circuitry (or one or more processors) may for example be configured to perform the method as defined in any of the embodiments of the first aspect disclosed herein (in other words, in the claims, the summary, or the detailed description). The system may for example comprise one or more non-transitory computer-readable storage media (or one or more memories) storing instructions that, upon execution by the processing circuitry (or one or more processors), cause the eye tracking system to perform the method as defined in any of the embodiments of the first aspect disclosed herein.

The effects and/or advantages presented in the present disclosure for embodiments of the method according to the first aspect may also apply to corresponding embodiments of the system according to the second aspect.

A third aspect provides embodiments of a non-transitory computer-readable storage medium storing instructions which, when executed by an eye tracking system, cause the eye tracking system to:
  perform calibration, the calibration comprising estimating values for a plurality of parameters defining respective optical properties of an eye, the plurality of parameters including a radius of a cornea of the eye;
  perform eye tracking for the eye using the values estimated at the calibration;
  estimate an updated value of the cornea radius; and perform eye tracking for the eye using the updated value of the cornea radius and a value estimated at the calibration for a parameter other than the cornea radius of the eye.

The non-transitory computer-readable storage medium may for example store instructions which, when executed by an eye tracking system (or by processing circuitry comprised in the eye tracking system), cause the eye tracking system to perform the method as defined in any of the embodiments of the first aspect disclosed herein (in other words, in the claims, the summary, or the detailed description).

The non-transitory computer-readable storage medium may for example be provided in a computer program product. In other words, a computer program product may for example comprise a non-transitory computer-readable storage medium storing instructions which, when executed by an eye tracking system, cause the eye tracking system to perform the method as defined in any of the embodiments of the first aspect disclosed herein.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

It will be appreciated that throughout the present disclosure, the term camera relates to any type of imaging device, image sensor, or the like, which is configured to generate an image based on received light.

Eye tracking methods, eye tracking systems, and associated storage media will be described below with reference to FIGS. 3-8. First, certain features of an eye will be described with reference to FIGS. 1-2.

Figure 1:
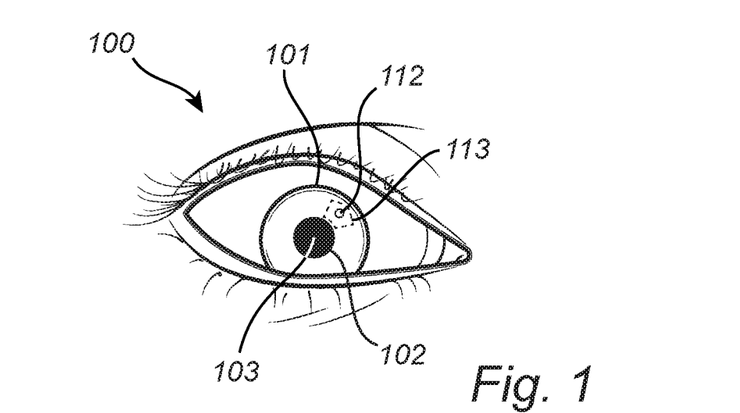
FIG. 1 is a front view of an eye.
Figure 2:
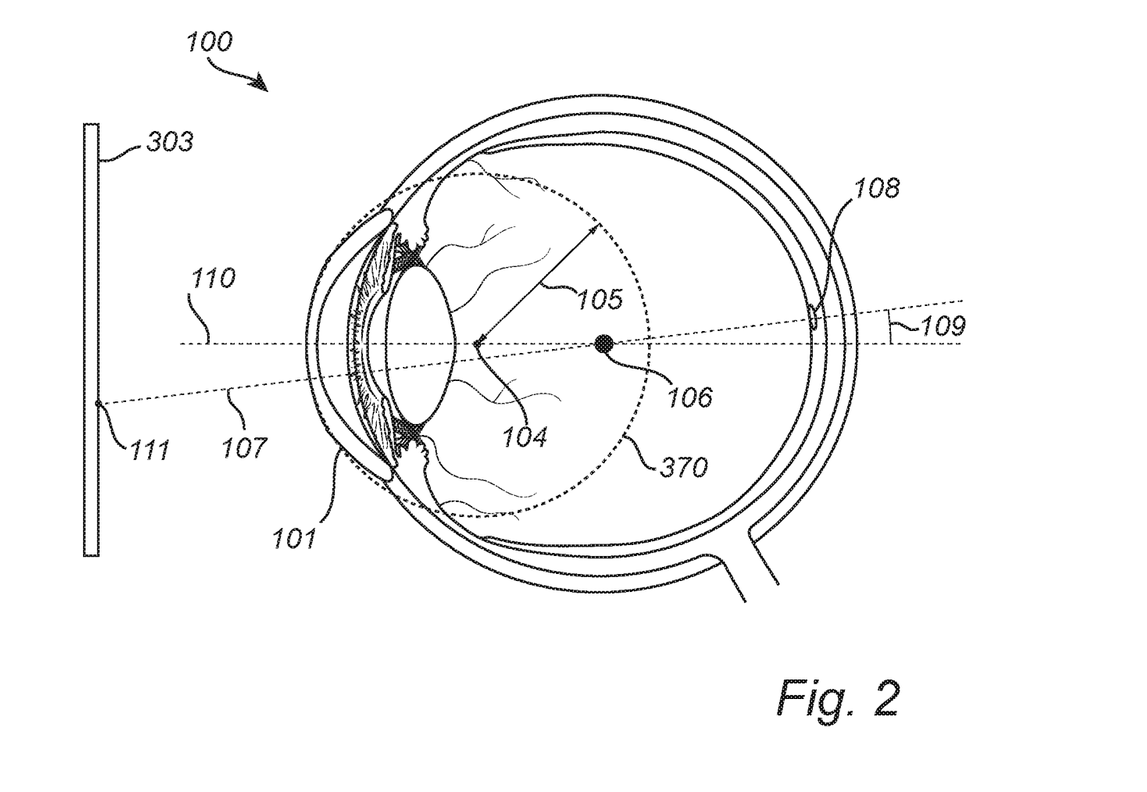
FIG. 2 is a cross sectional view of the eye from FIG. 1 from the side of the eye.

FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a cornea 101 and a pupil 102 with a pupil center 103. The cornea 101 is curved. The cornea 101 is often modeled as a spherical surface with a center of curvature 104 which is simply referred to as the cornea center 104. In such a spherical cornea model, the cornea 101 has a radius of curvature referred to as the radius 105 of the cornea 101 or simply the cornea radius 105. In reality, the cornea 101 is typically not perfectly spherical. A non-spherical cornea model may therefore be employed. In such a non-spherical cornea model, the radius of curvature is different for different points along the cornea 101. Hence, if a non-spherical cornea model is employed, the term "cornea radius" may be employed to refer to the radius of curvature at a point or region of the cornea 101. It will be appreciated that at least some embodiments provided in the present disclosure may be employed with a spherical cornea model as well as with a non-spherical cornea model. The eye 100 has a center 106. The visual axis 107 of the eye 100 passes through the center 106 of the eye 100 to the fovea 108 of the eye 100. The visual axis 107 forms an angle 109 relative to the optical axis 110 of the eye 100. The deviation or offset between the visual axis 107 and the optical axis 110 is often referred to as the fovea offset 109. The fovea offset 109 may for example be defined via two angles, where the first angle indicates the size (or magnitude) of the offset, and the second angle indicates the plane in which the offset is located (in other words, the plane in which the visual axis 107 and the optical axis 110 are located). FIG. 1 also shows a reflection 112 of an illuminator at the cornea 101. Such a reflection 112 is also known as a glint.

Figure 3:
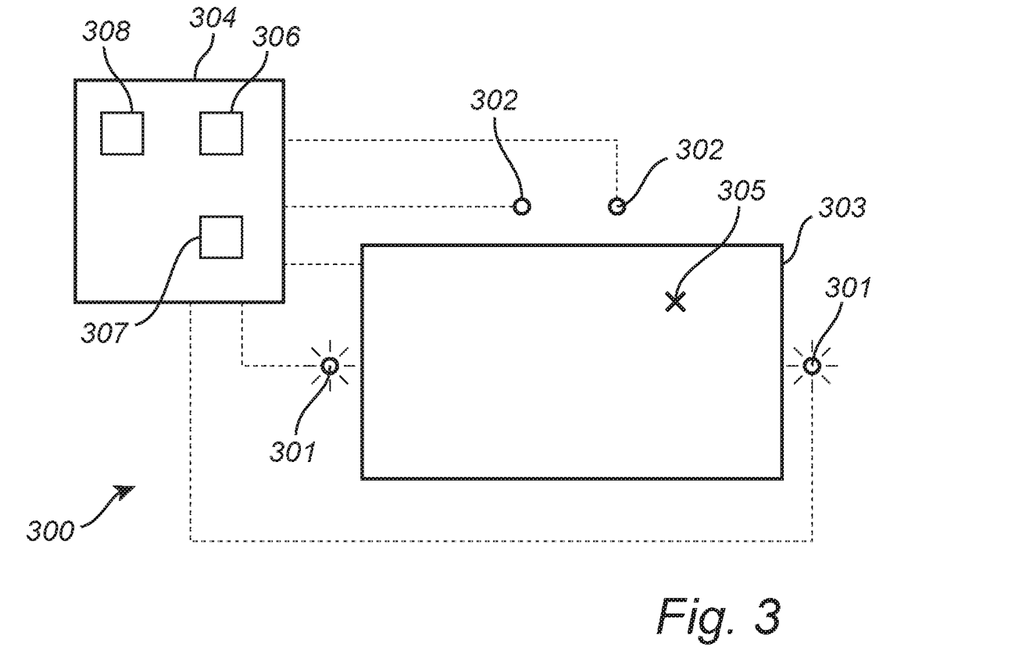
FIG. 3 is a schematic overview of an eye tracking system, according to an embodiment.

FIG. 3 is a schematic overview of an eye tracking system 300, according to an embodiment. The system 300 comprises one or more illuminators 301 for illuminating the eye 100 and one or more cameras 302 for capturing images of the eye 100 while the eye 100 looks at a display 303. The system 300 also comprises processing circuitry 304 configured to estimate where the eye 100 is located and/or where the eye 100 looking. The processing circuitry 304 may for example estimate a gaze direction (or gaze vector) of the eye 100 (corresponding to a direction of the visual axis 107), or a gaze point 111 of the eye 100 at the display 303 (as shown in FIG. 2). In other words, the eye tracking system 300 may for example be a gaze tracking system.

The processing circuitry 304 is communicatively connected to the illuminators 301 and the cameras 302, for example via a wired or wireless connection. The processing circuitry 304 may also be communicatively connected to the display 303, for example for controlling (or triggering) the display 303 to show test stimulus points 305 for calibration of the eye tracking system 300.

The illuminators 301 may for example be infrared or near infrared illuminators, for example in the form of light emitting diodes (LEDs). However, other types of illuminators may also be envisaged. FIG. 3 shows example illuminators 301 located at either side of the display 303, but the illuminators 301 could be located elsewhere.

The cameras 302 may for example be charged-coupled device (CCD) cameras or Complementary Metal Oxide Semiconductor (CMOS) cameras. However, other types of cameras may also be envisaged. FIG. 3 shows example cameras 302 located above the display 303, but the cameras 302 could be located elsewhere, for example below the display 303.

The display 303 may for example be a liquid-crystal display (LCD) or a LED display. However, other types of displays may also be envisaged. The display may 303 may for example be flat or curved. The display 303 may for example be a TV screen, a computer screen, or may be part of a head-mounted device (HMD) such as a virtual reality (VR) or augmented reality (AR) device. The display 303 may for example be placed in front of one of the user's eyes. In other words, separate displays 303 may be employed for the left and right eyes. Separate eye tracking equipment (such as illuminators 301 and cameras 302) may for example be employed for the left and right eyes.

The processing circuitry 304 may be employed for eye tracking for both eyes, or there may be separate processing circuitry 304 for the left and right eyes. The eye tracking system 300 may for example perform eye tracking for the left and right eyes separately, and may then determine a combined gaze point as an average of the gaze points for the left and right eyes.

The processing circuitry 304 may for example comprise one or more processors 306. The processor(s) 306 may for example be application-specific integrated circuits (ASIC) configured to perform a specific eye tracking method. Alternatively, the processor(s) 306 may configured to execute instructions (for example in the form of a computer program) stored in one or more memories 307. Such a memory 307 may for example be comprised in the circuitry 306 of the eye tracking system 300, or may be external to (for example located remotely from) the eye tracking system 300. The memory 307 may store instructions for causing the eye tracking system 300 to perform an eye tracking method.

It will be appreciated that the eye tracking system 300 described above with reference to FIG. 3 is provided as an example, and that many other eye tracking systems may be envisaged. For example, the illuminators 301 and/or the cameras 302 need not necessarily be regarded as part of the eye tracking system 300. The eye tracking system 300 may for example consist only of the processing circuitry 304. There are even eye tracking systems that do not employ illuminators at all. The display 303 may for example be comprised in the eye tracking system 300, or may be regarded as separate from the eye tracking system 300.

Eye tracking performed by systems such as the eye tracking system 300 in FIG. 3 typically employ an eye model. This eye model is calibrated to properties of the individual user's eyes. During the calibration, parameters such as the fovea offset 109 and the cornea radius 105 are estimated. Some users experience that eye tracking performance decreases (or deteriorates) over time. One way to address this problem is to recalibrate the eye tracking system 300 when performance degradation is detected. The inventors have realized that such full recalibration may not be necessary. The paper "*Fluctuations in intraocular pressure and the potential effect on aberrations of the eye*" by M. Asejczyk-Widlicka et al. in Br J Ophthalmol 2007; 91:1054-1058 (which is incorporated herein by reference in its entirety), describes that variations in intraocular pressure during the day are associated with changes in corneal radius of curvature and aberrations. The paper is based on a study of 17 persons, and a cornea radius change of up to 0.53 mm has been measured between morning (09:30) and noon (12:30). While this paper is focused on the effect on aberrations of the eye, the inventors have realized that the change in cornea radius may affect eye tracking performance.

Indeed, the changes in corneal radius detected in the above-mentioned paper (changes up to 0.53 mm) may cause significant errors for estimated gaze points. Recalibration of the cornea radius may therefore improve eye tracking performance significantly, even if the originally calibrated values are employed for the rest of the eye model. Methods exploiting this realization will be described below with reference to FIGS. 4-8.

Figure 4:
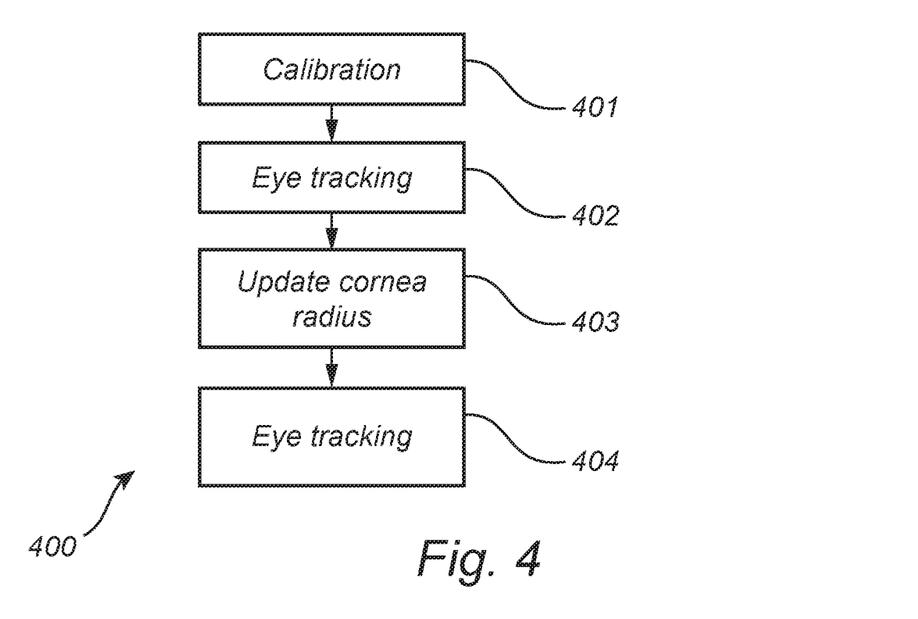
FIG. 4 is a flow chart of an eye tracking method, according to an embodiment.

FIG. 4 is a flow chart of an eye tracking method 400, according to an embodiment. The method 400 may for example be performed by the eye tracking system 300, or by the processing circuitry 304 of the eye tracking system 300.

The method 400 comprises performing calibration 401. The calibration 401 comprises estimating values for a plurality of parameters defining respective optical properties of an eye 100. The plurality of parameters includes the cornea radius 105 of the eye 100, and may for example also include parameters such as:

the fovea offset 109 of the eye 100; and/or
the distance between the pupil center 103 and the cornea center 104; and/or
the refractive index of the aqueous humor; and/or
the refractive index of the cornea 101.

An example implementation of the calibration 401 will be described below with reference to FIG. 6. It will be appreciated that if a non-spherical cornea model is employed, then the cornea radius estimated at the calibration 401 may be a local radius of curvature, such as a radius of curvature at a point along the cornea 101 or at a region of the cornea 101.

The method 400 comprises performing 402 eye tracking (for example estimating a position of the eye 100 in space, estimating a gaze direction 107, or estimating a gaze point 111) for the eye 100 using the values estimated at the calibration 401. An example implementation of the eye tracking 402 will be described below with reference to FIG. 7.

The method 400 comprises estimating 403 an updated value of the cornea radius 105. An example implementation of the estimation 403 will be described below with reference to FIG. 5. It will be appreciated that if a non-spherical cornea model is employed, then the updated cornea radius estimated at the step 403 may be a local radius of curvature, such as a radius of curvature at a point along the cornea 101 or at a region of the cornea 101.

The method 400 comprises performing 404 eye tracking for the eye 100 using the updated value of the cornea radius 105 and a value estimated at the calibration 401 for a parameter other than the cornea radius 105 of the eye 100. In other words, for at least one parameter (such as for example the fovea offset 109) other than the cornea radius 105, there may be no need to estimate updated values, and the eye tracking may continue to use the original value for that parameter also after an updated value has been estimated for the cornea radius 105. An example implementation of the eye tracking 404 will be described below with reference to FIG. 7.

According to some embodiments, the parameter for which a non-updated value (or original value from the initial calibration 401) is used in the eye tracking 404 is a fovea offset 109 of the eye 100. It will be appreciated that the fovea offset 109 of the eye 100 may for example be defined via two angles, where the first angle indicates the size of the offset, and the second angle indicates the plane in which the offset is located (in other words, the plane in which the visual axis 107 and the optical axis 110 are located). The eye tracking 404 may for example employ non-updated (or original) values for one of these two angles, or for both of these two angles. Other examples of parameters for which non-updated (or original values from the initial calibration) may be used in the eye tracking 404 may include:
the distance between the pupil center 103 and the cornea center 104; and/or
the refractive index of the aqueous humor; and/or
the refractive index of the cornea 101.

According to some embodiments, updated values of the cornea radius 105 may be estimated repeatedly, and the eye tracking 404 may be performed using the latest (in other words the most recent) updated value of the cornea radius available at the time. For at least a period of time, an updated value of the cornea radius 105 may for example be estimated at least once an hour, or at least once every ten minutes, or at least once every minute. By repeatedly estimating updated values of the cornea radius 105, the cornea radius 105 used in the eye tracking 404 may remain close to the true value, so that eye tracking performance may be maintained over time.

Updated values for the cornea radius 105 may for example be estimated at predefined time intervals. However, embodiments may also be envisaged in which the time intervals between consecutive estimations of new values of the cornea radius 105 are not predefined.

According to some embodiments, the estimation 403 of an updated value for the cornea radius 105 is triggered by a timer. The eye tracking system 300 may for example employ such a timer 308. The timer 308 may for example be comprised in the processing circuitry 304. The timer may for example be set to a predefined value each time a new updated value has been determined for the cornea radius 105. However, embodiments may also be envisaged in which the timer may be set to different values (such as for example random values).

According to some embodiments, updated values for at least one of the plurality of parameters (such as for example the cornea offset 109) are not estimated after the calibration 401. In other words, an updated value of the cornea radius 105 is estimated 403 after the calibration 401, but no updated values are estimated for one or more of the other parameters estimated at the calibration 401.

According to some embodiments, for at least one of the plurality of parameters estimated at the calibration 401 (such as for example the cornea offset 109), updated values may be estimated after the calibration 401, but such updated values are estimated more seldom (or less often) than updated values of the cornea radius 105 are estimated. A full recalibration of the eye tracking system 300 may for example be performed now and then (including estimation of updated values for all parameters of the eye model), but updated values of the cornea radius 105 may be estimated more often than that.

Figure 5:
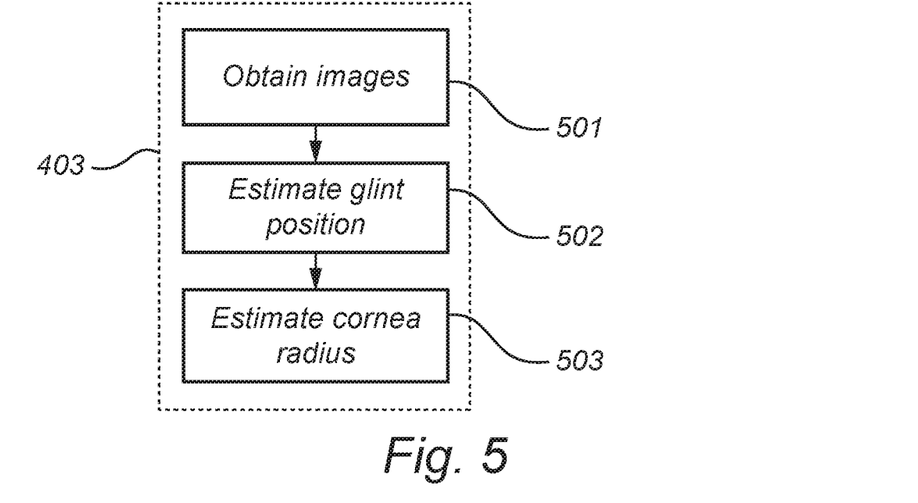
FIG. 5 is a flow chart of a scheme for estimating a cornea radius in the method from FIG. 4, according to an embodiment.

FIG. 5 is a flow chart of a scheme for estimating 403 the cornea radius 105 in the method 400 from FIG. 4, according to an embodiment. In the present embodiment, the step 403 of estimating an updated value of the cornea radius 105 comprises:
obtaining 501 at least two images of the eye 100 captured by respective cameras 302 when the eye 100 is illuminated by at least two illuminators 301;
estimating 502, based on the images, positions of reflections 112 of the illuminators 301 at the cornea 101 of the eye 100; and
estimating 503 an updated value of the cornea radius 105 based on the positions of the reflections 112 at the cornea 101 and positions of the illuminators 301 relative to the cameras 302 by which the images were captured.

The curvature of the cornea 101 (which may be expressed in terms of the cornea radius 105) affects how the glints 112 appear at the cornea 101. The cornea radius 105 may therefore be estimated by analyzing the positions of the glints 112 and using the fact that the positions of the illuminators 301 relative to the cameras 302 are known. In particular, the cornea radius 105 may be estimated without knowing the true gaze point. In other words, the cornea radius 105 may be estimated while performing eye tracking without having to ask the user to look at known stimulus points (and without assuming that the user is looking at certain stimulus points). Updated values of the cornea radius 105 may therefore be estimated 403 more or less continuously, without bothering the user. Increasing the number of illuminators 301 and/or the number of cameras 302 may increase the robustness (and/or accuracy and/or precision) of these computations.

A detailed example of how the cornea radius 105 may be estimated in this setting (two illuminators and two cameras) is provided in section II.C of the paper "*General Theory of Remote Gaze Estimation Using the Pupil Center and Corneal Reflections*" by E. D. Guestrin et al. in IEEE Transactions on biomedical engineering, vol. 53, no. 6, June 2006 (which is incorporated herein by reference in its entirety), where the cornea radius is denoted by "R".

According to some embodiments, estimating 403 an updated value of the cornea radius 105 is performed during eye tracking (or based on information obtained during eye tracking). Eye tracking techniques such as pupil center corneal reflection (PCCR) involve use of corneal reflections 112 to determine a gaze point and/or a gaze direction. Information obtained during the eye tracking (for example positions of corneal reflections 112) may therefore be employed also for estimating an updated valued of the cornea radius 105.

Figure 6:
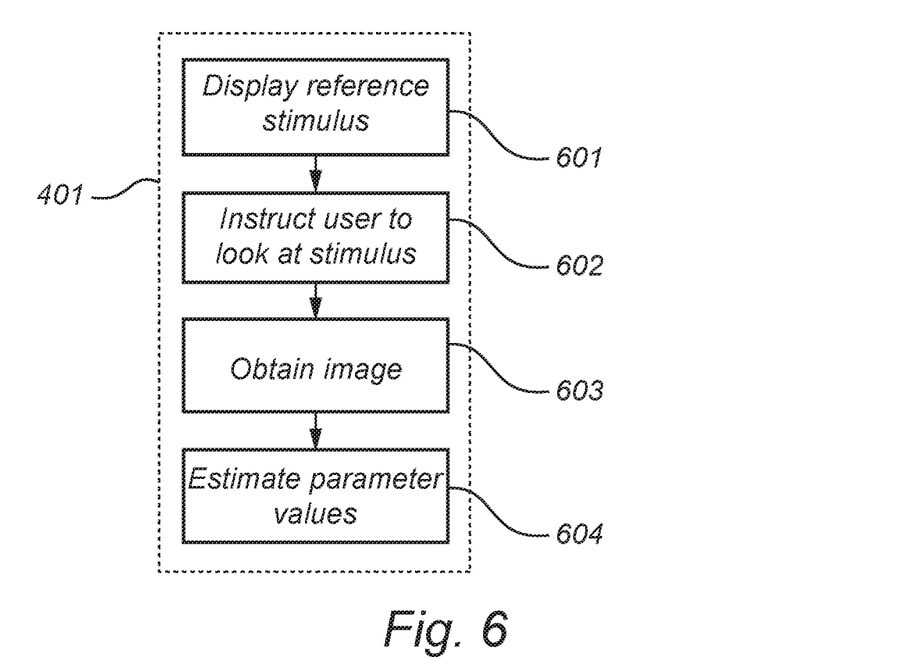
FIG. 6 is a flow chart of a scheme for calibration in the method from FIG. 4, according to an embodiment.

FIG. 6 is a flow chart of a scheme for calibration 401 in the method 400 from FIG. 4, according to an embodiment. In the present embodiment, the calibration 401 comprises:
providing 601 signaling for displaying a reference stimulus 305 at a known position at a display 303;
providing 602 signaling for prompting a user to look at the reference stimulus 305;
obtaining 603 an image of the eye 100 captured when the user looks at the reference stimulus 305; and
estimating 604 values for the plurality of parameters (defining respective properties of the eye 100) based on at least the obtained image and the known position of the reference stimulus 305.

In other words, the processing circuitry 304 of the eye tracking system 300 controls the display 303 to show the reference stimulus 305 at a known position of the display 303 (for example as a clearly visible dot or X). The processing circuitry 304 instructs the user (for example via text at the display 303 or via an audio message) to look at the reference stimulus 305. The camera(s) 302 then captures an image of the eye 100 when the eye 100 is looking at the reference stimulus 305 (or when the eye 100 is assumed/believed to be looking at the reference stimulus 305). The processing circuitry 304 then estimates 604 values for the plurality of parameters based on at least the obtained image and the known position of the reference stimulus 305. The calibration 401 typically includes use of multiple reference stimulus points, which the user is prompted to look at one after the other.

As described above in relation to FIG. 4, the parameters estimated during the calibration 401 may include:
- the cornea radius 105; and/or
- the fovea offset 109; and/or
- the distance between the pupil center 103 and the cornea center 104;
- the refractive index of the aqueous humor; and/or
- the refractive index of the cornea 101.

According to some embodiments, the estimation of an updated value for the cornea radius 105 is performed without prompting the user to look at a reference stimulus 305 at a known position at a display 303, or at least without assuming that the user looks at a certain position at the display 303 (such as a known reference stimulus point 305). As described above with reference to FIG. 5, the cornea radius 105 may be estimated without knowledge of the true gaze point, so there is no need for reference stimulus points.

Figure 7:
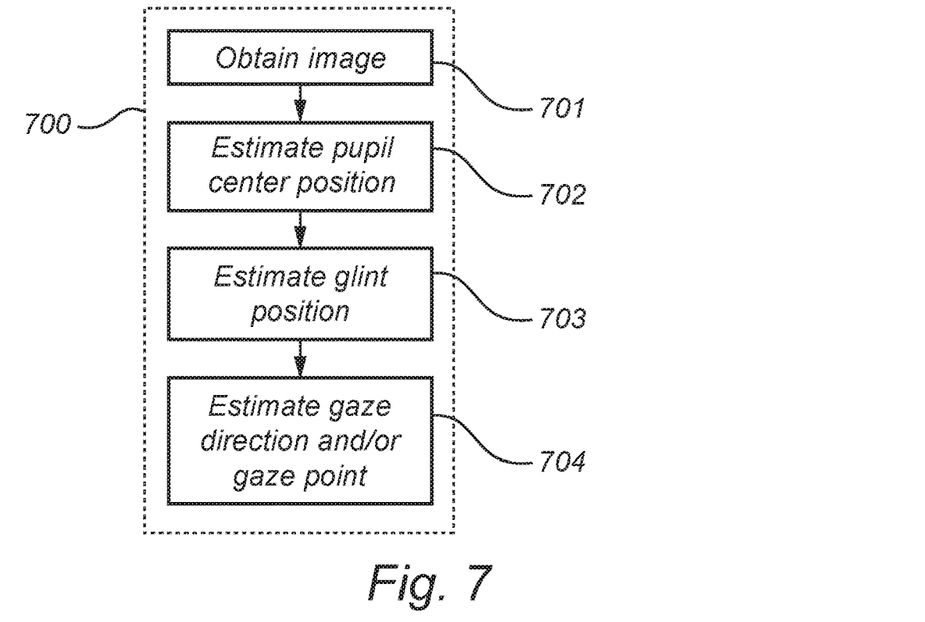
FIG. 7 is a flow chart of a scheme for performing eye tracking in the method from FIG. 4, according to an embodiment.

FIG. 7 is a flow chart of a scheme 700 for performing eye tracking in the method 400 from FIG. 4, according to an embodiment. In the present embodiment, the step 402 of performing eye tracking for the eye 100 using the values estimated at the calibration 401 (and similarly the step 404 of performing eye tracking for the eye 100 using the updated value of the cornea radius 105 and a value estimated at the calibration for a parameter other than the cornea radius 105 of the eye 100) is performed via an eye tracking scheme 700 which comprises:
- obtaining 701 an image of the eye 100 captured when the eye 100 is illuminated by an illuminator 301;
- estimating 702, based on the image, a position of a pupil center 103 of the eye 100;
- estimating 703, based on the image, a position of a reflection 112 of the illuminator 131 at the cornea 101 of the eye 100 (or a position of a center of the reflection 112 of the illuminator 131 at the cornea 101 of the eye 100); and
- estimating 704 a gaze direction 107 and/or gaze point 111 based on the position of the pupil center 103 and the cornea reflection 112.

This type of eye tracking is often referred to as pupil center corneal reflection (PCCR). The PCCR scheme 700 may for example be based on corneal reflections 112 (also called glints) of multiple illuminators 301, and/or images of the eye 100 captured by multiple cameras 302.

Embodiments may also be envisaged in which the first eye tracking step 402 is performed via the PCCR scheme 700, while the second eye tracking step 404 is performed via some other eye tracking scheme. Embodiments may also be envisaged in which the second eye tracking step 404 is performed via the PCCR scheme 700, while the first eye tracking step 402 is performed via some other eye tracking scheme.

PCCR eye tracking typically includes finding out where the eye ball is located in space, and finding out a rotation (or direction) or the eye ball. This is usually done by finding the pupil center 103 and the center of the glint 112. Roughly speaking, the pupil 102 is employed to find the direction of the eye 100, and the glint 112 is employed to determine the position of the eye 100 in space. The position of the eye 100 in space may for example be defined via the center 106 of the eye 100. Hence, according to some embodiments, the step 704 of estimating a gaze direction 107 and/or a gaze point 111 comprises estimating a position 106 of the eye 100 based on the position of the reflection 112 at the cornea 101, the cornea radius 105, and a position of the illuminator 301 relative to a camera 302 by which the image was captured.

Figure 8:
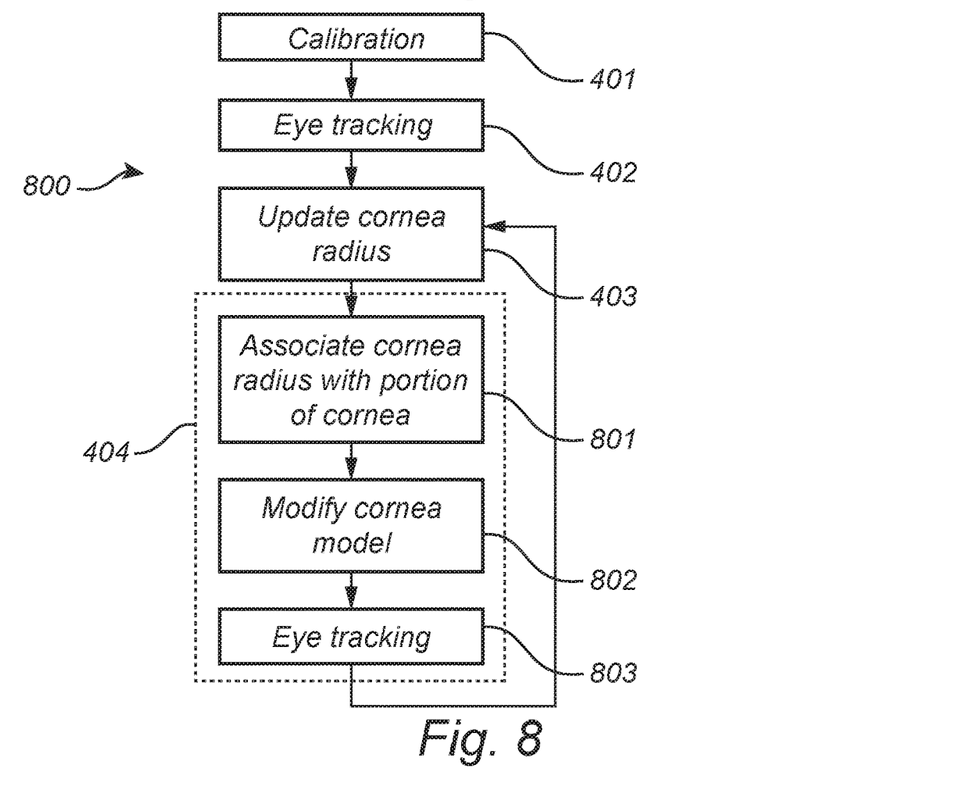
FIG. 8 is a flow chart of an eye tracking method involving modification of a cornea model, according to an embodiment.

FIG. 8 is a flow chart of an eye tracking method 800 involving modification of a cornea model, according to an embodiment. The method 800 includes the three first steps 401-403 from the method 400 described above with reference to FIG. 4, so the description of those steps is not repeated here. In the present embodiment, the eye tracking is performed based on a model of the cornea 101. Each of a plurality of updated values of the cornea radius 105 is estimated 403 based on at least one cornea reflection 112. The method 800 comprises:
- associating 801 each of the updated values of the cornea radius 105 with a portion 113 or region of the cornea 101 (an example portion 113 is shown in FIG. 1) where the at least one cornea reflection 112 employed for estimating that updated value is located;
- providing 802 a modified cornea model based on the updated values of the cornea radius 105 and the associated portions 107 of the cornea 101; and
- performing 803 eye tracking for the eye 100 using the modified cornea model.

The cornea 101 may not have a perfectly spherical shape, but locally, the cornea 101 may still be approximately spherical. In other words, the cornea 101 may have an approximately spherical shape in certain regions. Different cornea radii may therefore be estimated for different portions (or regions) of the cornea 101. The cornea model may be updated gradually during the eye tracking, so that more and more portions of the cornea 101 are gradually provided with appropriate cornea radii in the cornea model, thereby improving eye tracking performance. Eventually, all parts of the cornea 101 may have been assigned appropriate cornea radii in the cornea model.

The steps 801-803 may be regarded as an example implementation of the step 404 from the method 400 described above with reference to FIG. 4. As indicated in FIG. 8, the step 404 may be repeated each time a new cornea radius 105 has been estimated.

According to some embodiments, the step 403 of estimating an updated value of the cornea radius 105 is performed in response to a reflection 112 at the cornea 101 of the eye 100 being located in a certain portion 113 or region of the cornea 101 (an example portion 113 is shown in FIG. 1).

In the cornea model described above with reference to FIG. 8 there may be no estimate available yet for the cornea radius 105 in a certain region 107 of the cornea 101. If the cornea reflection 112 (or glint) is located in that portion 113, it may be a good idea to estimate a cornea radius 105 for that portion 113 to improve the cornea model. If, on the other hand, there is already a cornea radius 105 available for the portion of the cornea where the cornea reflection 112 is located, there may be no need to update the cornea model in that portion of the cornea 101.

The methods and schemes described above with reference to FIGS. 4-8 represent a first aspect of the present disclosure. The eye tracking system 300 described above with reference to FIG. 3 represents a second aspect of the present disclosure. The system 300 (or the processing circuitry 304 of the system 300) may for example be configured to perform the eye tracking method of any of the embodiments of the first aspect described above. The system 300 may for example be configured to perform the method 400 described above with reference to FIG. 4, or the method 800 described above with reference to FIG. 8.

According to an embodiment, the eye tracking system 300 comprises processing circuitry 304 configured to:

perform calibration, the calibration comprising estimating values for a plurality of parameters defining respective optical properties of an eye 100, the plurality of parameters including a cornea radius 105 of the eye 100;

perform eye tracking for the eye 100 using the values estimated at the calibration;

estimate an updated value of the cornea radius 105; and perform eye tracking for the eye 100 using the updated value of the cornea radius 105 and a value estimated at the calibration for a parameter other than the cornea radius 105 of the eye 100.

As describe above with reference to FIG. 3, the eye tracking system 300 need not necessarily comprise all the elements shown in FIG. 3.

A third aspect of the present disclosure is represented by embodiments of a non-transitory computer-readable storage medium 307 storing instructions which, when executed by the eye tracking system 300, cause the eye tracking system 300 to perform the method of any of the embodiments of the first aspect described above (such as the method 400 described above with reference to FIG. 4, or the method 800 described above with reference to FIG. 8).

According to an embodiment, the non-transitory computer-readable storage medium 307 stores instructions which, when executed by the eye tracking system 300, cause the eye tracking system 300 to:

perform calibration, the calibration comprising estimating values for a plurality of parameters defining respective optical properties of an eye 100, the plurality of parameters including a cornea radius 105 of the eye;

perform eye tracking for the eye 100 using the values estimated at the calibration;

estimate an updated value of the cornea radius 105; and perform eye tracking for the eye 100 using the updated value of the cornea radius 105 and a value estimated at the calibration for a parameter other than the cornea radius 105 of the eye 100.

As described above with reference to FIG. 3, the storage medium 307 need not necessarily be comprised in the system 300.

The person skilled in the art realizes that the present invention is by no means limited to the preferred embodiments described above. On the contrary, many modifications and variations are possible within the scope of the appended claims. For example, the methods and schemes described above with reference to FIGS. 4-8 may be combined to form further embodiments. Further, it will be appreciated that the eye tracking system 300 shown in FIG. 300 is merely intended as an example, and that other eye tracking systems may also perform the methods described above with reference to FIGS. 4-8.

It will be appreciated that processing circuitry 304 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium 307 (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B". The mere fact that certain measures are recited in mutually different dependent claims does not indicate that a combination of these measures cannot be used to advantage. Any reference signs in the claims should not be construed as limiting the scope.

The invention claimed is:

1. An eye tracking method comprising:
   performing calibration, the calibration comprising estimating values for a plurality of parameters defining respective optical properties of an eye, said plurality of parameters including an initial value of a radius of a cornea of the eye;
   performing eye tracking for the eye using the values estimated at the calibration, including the initial value of the radius of the cornea;
   estimating an updated value of the radius of the cornea; and
   performing eye tracking for the eye using the updated value of the cornea radius and a value estimated at the calibration, prior to the estimation of the updated value of the radius of the cornea, for a parameter other than the cornea radius of the eye.

2. The method of claim 1, wherein said parameter other than the cornea radius of the eye is a fovea offset of the eye.

3. The method of claim 1, wherein estimating an updated value of the cornea radius comprises:
   obtaining at least two images of the eye captured by respective cameras when the eye is illuminated by at least two illuminators;
   estimating, based on the images, positions of reflections of the illuminators at the cornea of the eye; and
   estimating an updated value of the cornea radius based on the positions of the reflections at the cornea and positions of the illuminators relative to the cameras by which the at least two images were captured.

4. The method of claim 1, wherein estimating an updated value of the cornea radius is:
   performed during eye tracking; or
   performed based on information obtained during eye tracking.

5. The method of claim 1, wherein, for at least a period of time, an updated value of the cornea radius is estimated at least once an hour, for example at least once every ten minutes.

6. The method of claim 1, wherein the estimation of an updated value for the cornea radius is triggered by a timer.

7. The method of claim 1, wherein the calibration comprises:
   providing signaling for displaying a reference stimulus at a known position at a display;

providing signaling for prompting a user to look at the reference stimulus;

obtaining an image of the eye captured when the user looks at the reference stimulus; and estimating values for said plurality of parameters based on at least the obtained image and the known position of the reference stimulus.

8. The method of claim 7, wherein the estimation of an updated value for the cornea radius is performed:

without prompting the user to look at a reference stimulus at a known position at the display; or without assuming that the user looks at a certain position at the display.

9. The method of claim 1, wherein the eye tracking comprises:

obtaining an image of the eye captured when the eye is illuminated by an illuminator;

estimating, based on the image, a position of a pupil center of the eye;

estimating, based on the image, a position of a reflection of the illuminator at the cornea of the eye; and estimating a gaze direction or gaze point based on the position of the pupil center and the cornea reflection.

10. The method of claim 9, wherein estimating a gaze direction or a gaze point comprises:

estimating a position of the eye based on the position of the reflection at the cornea, the cornea radius, and a position of the illuminator relative to a camera by which the image was captured.

11. The method of claim 1, wherein the eye tracking is performed based on a model of the cornea, wherein each of a plurality of updated values of the cornea radius is estimated based on at least one reflection of an illuminator at the cornea of the eye, the method comprising:

associating each of the updated values of the cornea radius with a portion of the cornea where the at least one cornea reflection employed for estimating that updated value is located;

providing a modified cornea model based on the updated values of the cornea radius and the associated portions of the cornea; and performing eye tracking for the eye using the modified cornea model.

12. The method of claim 1, wherein estimating an updated value of the cornea radius is performed in response to a reflection at the cornea of the eye being located in a certain portion of the cornea.

13. The method of claim 1, wherein:

after said calibration, updated values of the cornea radius are estimated more often than updated values for at least one of said plurality of parameters; or updated values for at least one of said plurality of parameters are not estimated after said calibration.

14. An eye tracking system comprising processing circuitry configured to:

perform calibration, the calibration comprising estimating values for a plurality of parameters defining respective optical properties of an eye, said plurality of parameters including an initial value of a radius of a cornea of the eye;

perform eye tracking for the eye using the values estimated at the calibration, including the initial value of the radius of the cornea:

estimate an updated value of the radius of the cornea; and perform eye tracking for the eye using the updated value of the cornea radius and a value estimated at the calibration, prior to the estimation of the updated value of the radius of the cornea, for a parameter other than the cornea radius of the eye.

15. The system of claim 14, wherein said parameter other than the cornea radius of the eye is a fovea offset of the eye.

16. The system of any of claim 14, wherein the processing circuitry is configured to estimate the updated value of the cornea radius by at least:

obtaining at least two images of the eye captured by respective cameras when the eye is illuminated by at least two illuminators;

estimating, based on the images, positions of reflections of the illuminators at the cornea of the eye; and estimating an updated value of the cornea radius based on the positions of the reflections at the cornea and positions of the illuminators relative to the cameras by which the at least two images were captured.

17. The system of any of claim 14, wherein the processing circuitry is configured to perform the eye tracking based on a model of the cornea, wherein the processing circuitry is configured to estimate each of a plurality of updated values of the cornea radius based on at least one reflection of an illuminator at the cornea of the eye, and wherein the processing circuitry is configured to:

associate each of the updated values of the cornea radius with a portion of the cornea where the at least one cornea reflection employed for estimating that updated value is located;

provide a modified cornea model based on the updated values of the cornea radius and the associated portions of the cornea; and perform eye tracking for the eye using the modified cornea model.

18. A non-transitory computer-readable storage medium storing instructions which, when executed by an eye tracking system, cause the eye tracking system to:

perform calibration, the calibration comprising estimating values for a plurality of parameters defining respective optical properties of an eye, said plurality of parameters including an initial value of a radius of a cornea of the eye;

perform eye tracking for the eye using the values estimated at the calibration, including the initial value of the radius of the cornea;

estimate an updated value of the radius of the cornea; and perform eye tracking for the eye using the updated value of the cornea radius and a value estimated at the calibration, prior to the estimation of the updated value of the radius of the cornea, for a parameter other than the cornea radius of the eye.

* * * * *